United States Patent [19]

Bremer, Jr.

[11] 4,242,921
[45] Jan. 6, 1981

[54] DEFORMED LOCKING CLAMP

[75] Inventor: Robert C. Bremer, Jr., Brownsburg, Ind.

[73] Assignee: Wallace Murray Corporation, New York, N.Y.

[21] Appl. No.: 952,557

[22] Filed: Oct. 18, 1978

[51] Int. Cl.³ ............................................. F16F 15/10
[52] U.S. Cl. ................................................... 74/574
[58] Field of Search ........................... 74/574; 188/1 B

[56] References Cited

U.S. PATENT DOCUMENTS

| 1,899,324 | 2/1933 | Griswold | 74/574 |
| 2,898,777 | 8/1959 | Boehm | 74/574 |
| 4,046,230 | 9/1977 | Troyer | 188/1 B |

Primary Examiner—Kenneth Dorner
Attorney, Agent, or Firm—Thomas J. Greer, Jr.

[57] ABSTRACT

A torsional vibration damper of the type having an inertia ring coupled to a hub by an elastomer member. The inertia ring is formed of two axially spaced ring parts. Each ring part carries an annular groove. A radially extending disc locking element (in the form of a flat washer) carries an axially extending key, the ends of the key being deformed towards a radially extending position by pushing the two ring parts together, the deformed key ends thus holding the two ring parts in assembly. The disc locking element also is compressed and thus exerts an axial force urging the two ring parts apart. In an embodiment, the disc locking element carries a second axially extending key, radially spaced from the first key and is similarly deformed into a second annular groove. In still another embodiment, one inertia ring part carries an integral, axially extending locking key. This key is received by a complementary annular groove in the other ring part, the disc locking element being optionally omitted. A similar deformation and locking action occurs upon pushing the two ring parts together, to thereby assemble the damper.

4 Claims, 8 Drawing Figures

FIG. 5
FIG. 6
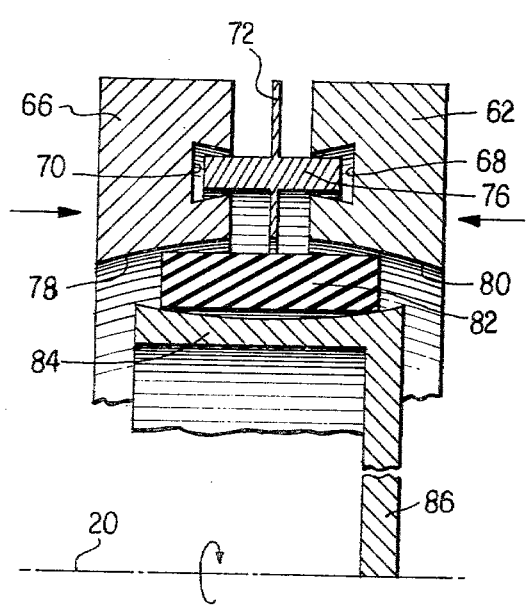
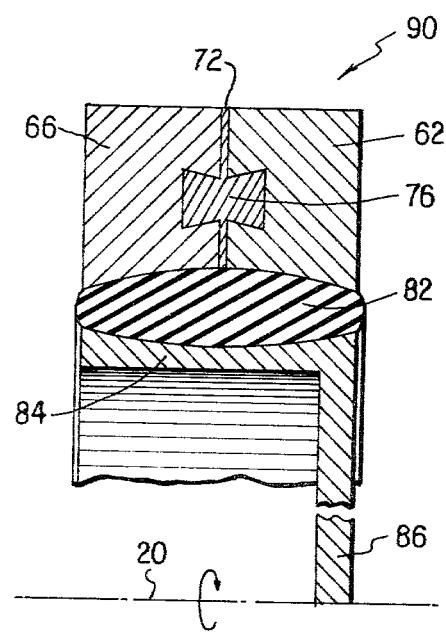
FIG. 7
FIG. 8
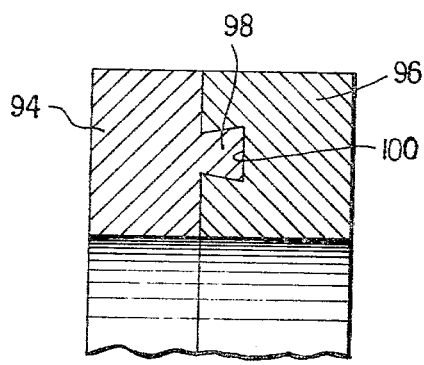
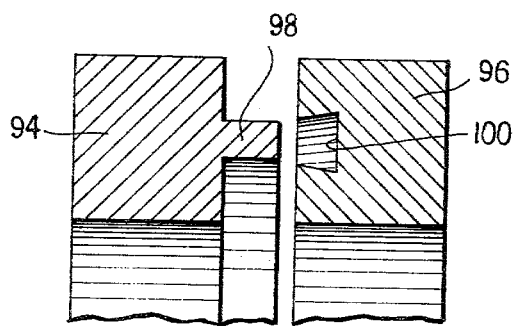

DEFORMED LOCKING CLAMP

This invention relates to torsional vibration dampers of the type having a hub secured to an outer inertia member by an elastomer annulus.

The invention exhibits particular utility to the damping of torsional vibrations in internal combustion engines. Such dampers are generally classified at present in class 74, sub-class 574 in the United States Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequencies of the crankshaft coincides with the particular firing frequency of the engine or a particular harmonic of that frequency. According to present theory of elastomer vibration dampers, a portion of the torsional vibrational energy transmitted to the crankshaft by the action of the pistons is converted into heat in the elastomer. The elastomer may accordingly be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 rpm simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and not utilizing a torsional vibration damper have one fairly high amplitude resonant frequency within the engine operating range of speeds. However, at any given engine speed, torsional vibrations from various orders of vibration are present and can be significant.

A great variety of damper configurations and modes of assembly has evolved in this art. While certain constructions exhibit desirable damping characteristics for certain engine applications, their use must always be measured against the difficulty of their assembly. Thus a damper configuration having specific damping properties may at times be discarded in favor of one whose configuration admits of simpler fabrication techniques. In accordance with the practice of this invention, a damper of the type having two ring parts which are coupled together to form the inertia ring or inertia member is formed by pushing the two ring parts together. Additionally, a radially extending washer may be placed (prior to assembly) between the two ring parts. Upon assembly, the washer is compressed and thus, after assembly, it exerts a force on the two ring parts urging them apart. This force thus gives rise to a tensile force, axially directed, in the now deformed locking key. The tensile force assists in holding the two ring parts together. Further, shock forces along the locking key are inhibited because the tensile force exists at all times subsequent to assembly. Additionally, the washer performs the function of inhibiting the entry of foreign matter or substances between the two ring parts.

The use of an axially compressed washer element between two inertia ring parts is known, as shown in U.S. Pat. No. 3,174,360 by Katzenberger. In that construction, however, the washer does not perform the same or a similar function. The two ring parts, for example, are held together by rivets, the washer elements playing no role in maintaining ring parts 16, 16a assembled. The main function of the Katzenberger washer element is to maintain a certain viscous liquid film at a desired thickness.

Further, the art is already aware (U.S. Pat. No. 4,046,230 by Troyer) of the use of an axially extending locking key element whose ends are deformed to define tangs for holding together two parts of an inertia ring or member. In that construction, however, the deformation occurs by spinning or by cramping the locking key ends. No axial compression or deformation occurs. The locking key is thus the same total length after assembly as prior to assembly and accordingly no tensive stress in the locking key is present subsequent to assembly. Further, the construction of this Troyer patent does not admit of an axially extending locking key at a location other than on the radially outermost periphery of the damper. Accordingly, the use of a second axially extending locking key would not appear possible. The same is true of the construction shown in U.S. Pat. No. 2,939,338 by Troyer. Namely, an axially extending locking key element, for a similar purpose, is of the same length after as prior to deformation. Again the position of the locking key appears limited to the outer periphery of the damper.

IN THE DRAWINGS:

FIG. 5 is a view similar to FIG. 4 and illustrates a second embodiment of the invention.

FIG. 6 illustrates the completed damper formed in accordance with the method of assembly shown in FIG. 5.

FIG. 7 is a view similar to FIG. 6 and illustrates a third embodiment.

FIG. 8 is a view illustrating the damper of FIG. 7 in a pre-assembled configuration.

Figure 1:
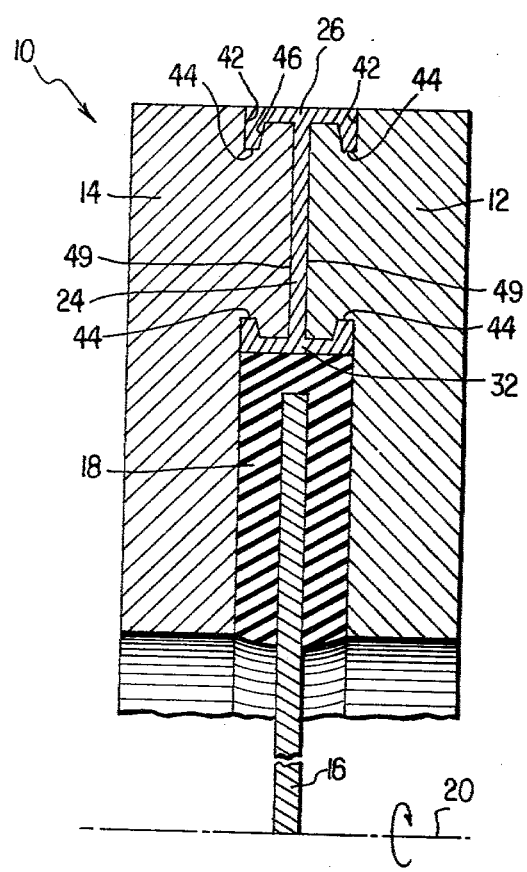
FIG. 1 is an upper, half-axial, longitudinal cross-section of a torsional vibration damper according to the practice of this invention.

Referring now to FIGS. 1–4 of the drawings, the numeral 10 denotes generally a torsional vibration damper formed in accordance with this invention and includes an inertia ring formed of two parts, the parts designated by the numerals 12 and 14. The numeral 16 denotes a hub of continuous angular extent whose radially outermost portion is attached to an elastomer member 18. As is customary in this art, the elastomer member 18 is usually adhesively bonded to both the sides of the inertia ring and to the radially outermost portion of the hub 16. The hub 16 is adapted to be attached to the crankshaft of an internal combustion engine. The numeral 20 denotes the axis of rotation of the crankshaft and of the torsional vibration damper 10. The mode of connecting the hub 16 to the crankshaft forms no part of this invention and may be carried out conventionally.

Figure 2:
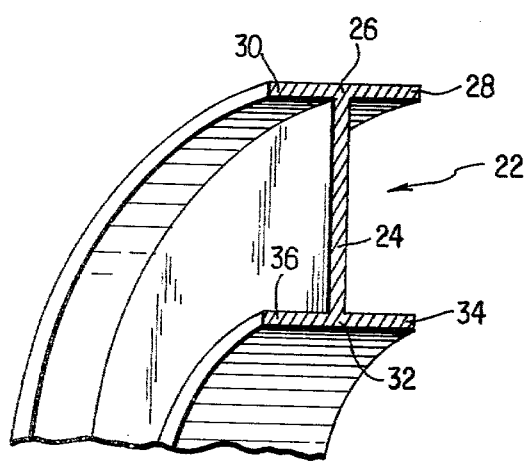
FIG. 2 is a cross-sectional and partially perspective view of a portion of the undeformed locking key 22 which couples the two ring halves of the inertia ring together.

Referring now specifically to FIG. 2 of the drawings, the numeral 22 denotes a ring locking element in the form of a radially extending disc, of continuous annular extent, the locking element including a radially extending disc 24 to which is integrally attached a locking key at each end. The radially outermost locking key is denoted by the numeral 26 and includes axially end-most portions 28 and 30, while the radially innermost locking key is denoted by the numeral 32 and carries axially outermost portions 34 and 36.

Figure 3:
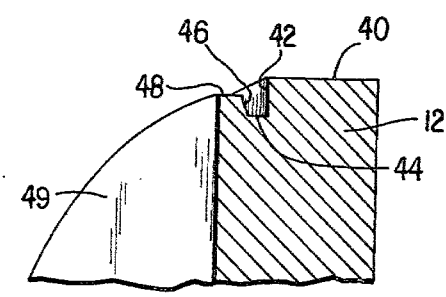
FIG. 3 is a partial cross-sectional and perspective view of a portion of inertia ring part 12 of FIG. 1.

Referring particularly now to FIG. 3 of the drawings, a portion of one of the inertia ring parts 12 is illustrated and shows the configuration of each of two continuous annular grooves in each of the ring parts 12 and 14. The radially outermost periphery of ring part 12 is denoted by the numeral 40. The numeral 42 denotes a circumferential cut extending radially inwardly to horizontally or axially extending portion 44, a slanted grooved wall portion 46 extending radially outwardly to axially extending portion 48. The numeral 49 denotes a side face of the ring part 12, this being the face which abuts disc member 24. The reader will understand that the corresponding radially innermost grooves in ring portion 12 are similarly formed, and will also understand that ring portin 14 is of symmetrical construction. That is to say, its side face 49 abuts the other side of disc portion 24.

Figure 4:
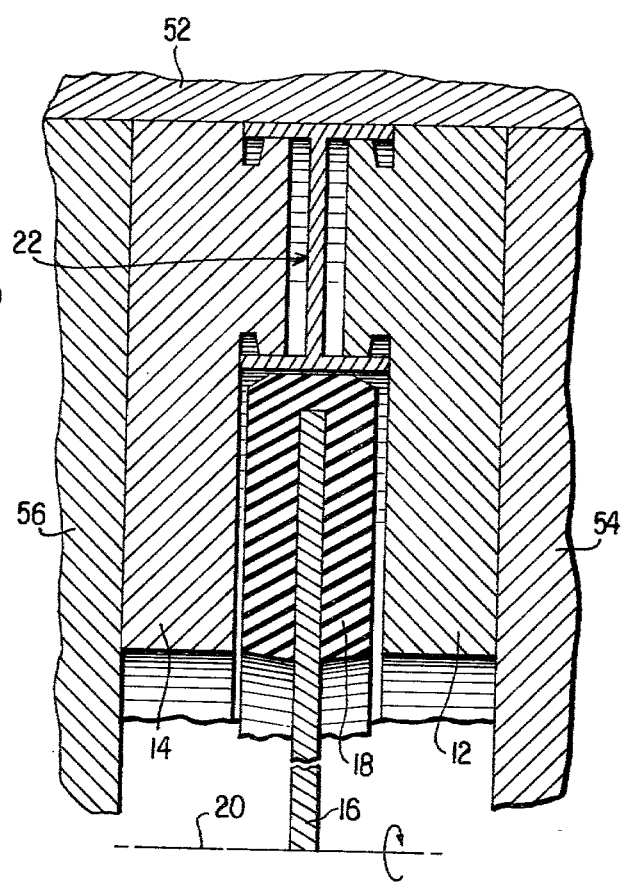
FIG. 4 is a view similar to FIG. 1 and illustrates the process of assembling the torsional vibration damper of this invention.

Referring now to FIG. 4 of the drawings, the method of assembly of the damper 10 is illustrated. The ring locking element 22 is placed as indicated relative to the ring parts 12 and 14. Similarly, elastomer member 18 is placed over the radially outermost peripheral portion and side portion of hub 16. Adhesive bonding films may be applied to the surfaces of elastomer 18 to cooperate with the complementary receiving surfaces of ring parts 12 and 14 and hub 16. A guide fixture 52 having a cylindrical interior cavity is positioned so that it surrounds the two ring parts 12 and 14. Next, ram elements 56 and 54, which may be in the form of discs, are placed on the exterior sides of ring parts 12 and 14. The ram elements are then pushed together. The axial extent of locking key elements 26 and 32 are longer than the distance between opposing surfaces 42 of ring parts 12 and 14 (see top of FIG. 1), with the consequence that motion of the ram elements towards each other results in deformation of the axially extending ends 28 and 30 of key element 26. The result is that the ends 28 and 30 are compelled to deform (swage) radially inwardly, to thereby form tang portions. The key portions are of sufficient radial extent in axial cross-section, that the deformation is characterized by shearing of adjacent planes in a general direction 45° from the direction of force application, rather than bending or buckling as would be the case with thinner cross-sections. A similar action occurs in the radially innermost locking key 32, with axially extending portions 34 and 36 being deformed (swaged) radially outwardly to thereby form tang portions. At the completion of the process, the damper has assumed the configuration illustrated at FIG. 1. Additionally, by proper selection of force exerted by ram elements 54 and 56, and by proper selection of the width of disc portion 24 and its material, the portion 24 is also axially and elastically squeezed, so that upon release of the ram elements, portion 24 will exert an outwardly directed force to thereby urge ring parts 12 and 14 from each other. This force is resisted by the tang elements of locking keys 26 and 32. The reader will also observe that elastomer member 18 serves as an abutment for the radially innermost locking key 32.

Referring now to FIGS. 5 and 6 of the drawings, a second embodiment of the invention is illustrated. Again, the inertia ring is formed of two portions, here denoted by the numerals 62 and 66. The numeral 68 denotes a generally trapezoidal in longitudinal cross-section continuous annular groove in ring 62 while the numeral 70 denotes a similar groove in ring part 66. The element 72 denotes a radially extending disc of continuous annular extent, disc 72 carrying a continuous annular locking key member 76 in the general form of a hoop. The numeral 78 denotes a curved radially innermost portion of ring part 66, while numeral 80 denotes a similar portion on ring part 62. The numeral 82 denotes a continuous annular elastomer member, while numeral 84 denotes an axially extending radially outermost curved portion of hub element 86. The elements shown at FIG. 5 are now assembled by means of ram elements such as 54 and 56 of the embodiment of FIG. 4, and a radially outermost guide element such as 52 of FIG. 4. The assembled inertia ring according to this embodiment is denoted by numeral 90 of FIG. 6. The reader will note that the undistorted length, measured axially, of locking key 76 is greater than the maximum axial distance of the composite groove defined by grooves 68 and 70 in the assembled position of FIG. 6. This is the distance between the longest parallel side of groove 68 and the longest parallel side of trapezoidal groove 70. Thus, locking key 76 undergoes deformation upon pushing the ring parts 62 and 66 together, the deformation resulting in the cross-section of the locking key shown at FIG. 6. The reader will observe that here, as in the previously described embodiment, tang locking portions are defined. Also, again similar to the previously described embodiment, disc portion 72 is axially squeezed to such an extent that when the ram pressure of assembly is released, the ring parts 62 and 66 are urged apart.

Referring now to FIGS. 7 and 8, yet another embodiment is illustrated. Here, the hub member and the elastomer member are not illustrated, the inertia ring parts alone being shown. The numeral 94 denotes one ring part, while the numeral 96 denotes the second ring part. The numeral 98 denotes a continuous annular flange, intergrally formed with ring part 94 and projecting in an axial direction from one side. The numeral 100 denotes a generally trapezoidal in cross-section annular groove of continuous extent in ring part 96. In order to form the inertia ring of this embodiment, the elements 96 and 94 are pushed together so as to assume the final form indicated at FIG. 8. The reader will observe that the axial extent of flange 98 is greater than the axial extent of groove 100, so that upon the axial movement of the ring portions towards each other, such as caused by ram elements similar to 54 and 56, of FIG. 4, flange 98 will deform as indicated at FIG. 7. The reader will observe that a tang portion is formed to maintain the elements together.

The reader will further note that a radially extending gasket, such as 72 of FIG. 5 or 24 of FIG. 1 may be employed with the two ring parts 94, 96 in the same manner.

In each embodiment the reader will observe that the tang portions of the locking key element rests against a surface which is inclined to the radial direction, i.e., surface 46 of FIG. 3, the non-parallel surfaces of grooves 68, 70 of FIG. 5, and the non-parallel surfaces of groove 100 of FIG. 7.

It is claimed:

1. A torsional vibration damper of the type having a hub and an inertia ring, the hub and inertia ring coupled to each other by an elastomer member, the hub adapted to be coupled to the crankshaft of an engine, the improvement comprising, the inertia ring being formed of two axially spaced ring parts, each said ring part having at least one annular groove on the outer ring periphery, said groove positioned axially between end faces of the ring part, a ring locking element in the form of a radially extending disc carrying at least one generally axially extending locking key, the axially outermost ends of the locking key being received in, respectively, the said ring part annular grooves, the axially outermost ends of the locking key each being deformed to each define a tang which extends at least partially in a radial direction, the outermost diameter of said locking key being no greater than the outermost diameter of said ring parts, the said radially extending disc being under axial compression and thus exerting an axially extending force against the two ring parts to urge them apart, the tangs of the locking key contacting portions of the annular grooves to resist the disc axially directed force.

2. The torsional vibration damper of claim 1 including a second annular groove on each said ring part, the first and second annular grooves on each ring part being radially spaced from each other, a second generally axially extending locking key, the ends of said second locking key being received in, respectively, the radially innermost pair of said second annular grooves, the axially outermost ends of the second locking key being deformed to define tangs which extend at least partially in a radial direction, the radially extending tang portions of the second locking key contacting, respectively, portions of the second set of grooves.

3. The torsional vibration damper of claim 2 wherein the said elastomer member is positioned between and sandwiched by the two ring parts at the radially innermost portion of the inertia ring.

4. The torsional vibration damper of claim 3 wherein the outermost radial portion of said hub extends into the elastomer member.

* * * * *